United States Patent [19]

Harold et al.

[11] Patent Number: 5,034,037

[45] Date of Patent: Jul. 23, 1991

[54] FILTER HOUSING WITH INTEGRAL FUEL TRAP

[75] Inventors: Donald M. Harold, Prior Lake; Kevin H. Schield, Inver Grove Heights, both of Minn.

[73] Assignee: Donaldson Company, Inc., Minneapolis, Minn.

[21] Appl. No.: 630,423

[22] Filed: Dec. 19, 1990

Related U.S. Application Data

[63] Continuation of Ser. No. 306,778, Feb. 3, 1989, abandoned.

[51] Int. Cl.[5] .............................................. B01D 46/02

[52] U.S. Cl. ........................................ 55/213; 55/320; 55/395; 55/421; 55/493; 60/605.1; 125/198 E; 125/559.1

[58] Field of Search ................. 55/213, 214, 306, 320, 55/394, 395, 421, 476, 337, 480, 481, 493, DIG. 30; 60/605.1; 123/198 E, 559.1

[56] References Cited

U.S. PATENT DOCUMENTS

| | | | |
|---|---|---|---|
| 3,696,666 | 10/1972 | Johnson et al. . | |
| 4,002,444 | 1/1977 | Artemov et al. | 55/320 X |
| 4,020,783 | 5/1977 | Anderson et al. . | |
| 4,031,847 | 6/1977 | Sullivan . | |
| 4,095,966 | 6/1978 | Isley | 55/394 |
| 4,312,645 | 1/1982 | Mavros et al. | 55/213 |
| 4,480,160 | 10/1984 | Stifelman . | |
| 4,482,368 | 11/1984 | Roberts | 55/480 |
| 4,514,193 | 4/1985 | Booth | 55/237 X |
| 4,557,739 | 12/1985 | Fortman et al. | 55/320 |
| 4,615,800 | 10/1986 | Stifelman et al. . | |
| 4,681,610 | 7/1987 | Warner | 55/394 |
| 4,842,622 | 6/1989 | Wamsley | 55/337 X |

OTHER PUBLICATIONS

"Air-Cooled Diesel Tank Engine", a publication of Teledyne Continental Motors, General Products Division, Ser. No. 3800/8-84.

*Primary Examiner*—Charles Hart
*Attorney, Agent, or Firm*—Merchant, Gould, Smith, Edell, Welter & Schmidt

[57] ABSTRACT

An engine air filter housing having an integral fluid trap to prevent liquid fuel from contacting and clogging filter elements. A fluid trap is located within a filtration chamber along the flow path of fuel from an engine flame starter. An air filter differential pressure sensing mechanism is integrally constructed in the filter housing access opening cover.

25 Claims, 2 Drawing Sheets

FIG. 1
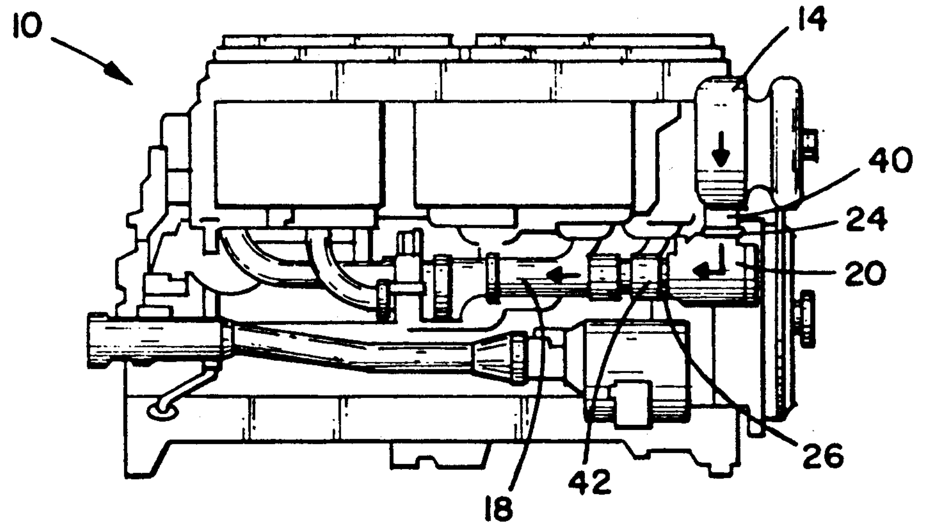
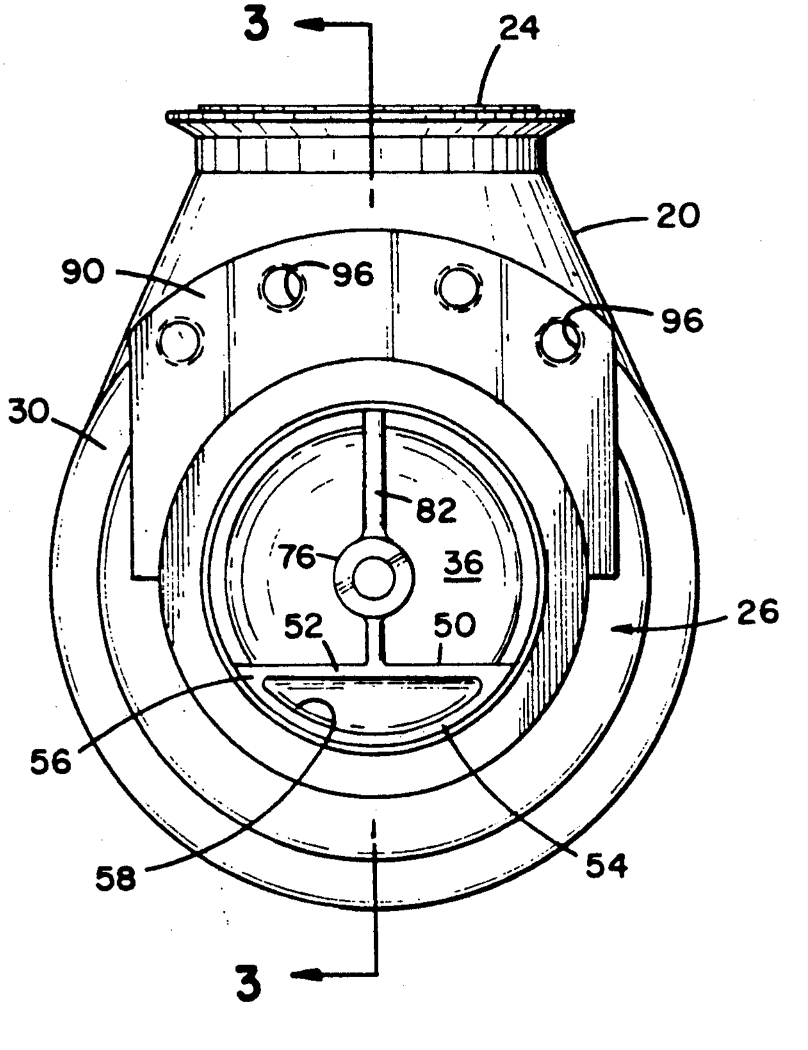
FIG. 2

FILTER HOUSING WITH INTEGRAL FUEL TRAP

This is a continuation of application Ser. No. 07/306,778, filed Feb. 3, 1989 abandoned.

FIELD OF THE INVENTION

The present invention relates generally to filter housings. More particularly, this invention concerns an air filter housing having an improved construction for trapping and recycling fluid entering the filter housing.

BACKGROUND OF THE INVENTION

Within the field of engines, particularly diesel engines, there exists a problem relating to fluids entering an engine air filter. When fluids enter and contact a filter element in an engine filter system, the efficiency of the filter element is dramatically lowered as compared with a dry filter. Consequently, fluids, such as fuels, which may enter an engine filter housing should be trapped in some manner to preserve the dryness of the filter element and to maintain the highest filter efficiency possible. Dry filter elements may also require less maintenance and result in longer filter element lifes. This is particularly important for filter systems in engines of combat vehicles. It is thus desirable to reduce or eliminate any fluids which may flow into engine air filtration systems on combat vehicles. This tends to extend the life of the filter, the engine, and possibly the vehicles themselves.

Certain types of vehicles utilize a flame starter as a means for starting the diesel engine associated with those vehicles. Heretofore, a problem has existed wherein the flame starters contribute to an accumulation of liquid fuel inside the air transfer duct between an engine turbocharger and an air intake manifold. This phenomenon results in the liquid fuel coming into contact with safety or secondary filters which may be located between the flame starter and the turbocharger, resulting in reduced air filtration capabilities.

What has been needed therefore has been an improved filter housing comprising means for trapping and recycling the liquid fuel before it contacts any portion of a filter element. What has been further needed is an air filter housing comprising an integral pressure sensing means for sensing and comparing the gas pressure on the high and low pressure sides of an air filter located within the filter housing.

Objects and advantages of the present invention in achieving these and other goals will become apparent from the following descriptions, taken in connection with the accompanying drawings, wherein are set forth by way of illustration and example certain embodiments of the present invention.

SUMMARY OF THE INVENTION

A filter housing is provided for an engine air filter which comprises a filter housing body, means for accessing internal portions of the housing body, and fluid trap means. More specifically, the filter housing body comprises wall portions forming an internal filtration chamber, the wall portions defining first and second openings for passage of engine gases through the filtration chamber to engine components. Also, the portion internal to the filter housing body which comprises the filtration chamber is accessible to permit insertion and removal of an air filter. The fluid trap means is provided for trapping fluid entering the filtration chamber through a housing body opening and for preventing any fluid from contacting an air filter located in the chamber. Preferably, the fluid trap means comprises wall portions defining a fluid collecting volume which extends into the filtration chamber. Also, a trap means aperture provides a fluid path into the trap means preferably at the housing body second opening.

A filter element support is axially arranged in the filtration chamber and comprises a first end connected to the housing body proximate the second opening, and a second end located opposite the first end which is configured for receipt of a mountable air filter. Preferably, the filter element support second end comprises a hollow open ended cavity. The cavity is preferably constructed and arranged for cooperation with a mounting bolt described below. Means for accessing the filtration chamber include a housing wall portion third opening located substantially opposite the housing wall portion second opening. A housing cover is removably connected to the housing at the third opening. Further, an aperture extends through the housing cover to provide means for receiving a mounting bolt therethrough. The mounting bolt is constructed and arranged for connecting the housing cover securely to the filter element support second end cavity.

It is further preferable to provide a filter housing for an engine air filter comprising an external mounting flange having a plurality of mounting apertures. This flange arrangement provides ambidextrous mounting means for mounting the housing between engine components at various rotational angles.

A preferred filter housing comprises an integral fluid trap means and filter element support. Moreover, preferred fluid trap means includes a substantially horizontally oriented top wall portion, an arcuate bottom wall portion having a curvature contoured to accommodate the shape of a filter element central mounting aperture, a rear wall portion, and a forward damming wall portion. The forward damming wall portion is preferably constructed and arranged to provide increased surface area at the opening to the trap means for guiding fluid into the trap means. More particularly, a preferred forward damming wall comprises a sloped wall extending from an inner portion of the housing second opening upward and into the filtration chamber. This configuration maximizes the diameter of the housing second opening and reduces the pressure loss of gas flowing through the second opening. Also, a preferred fluid trap means comprises a top wall portion having a tapered recessed portion which is widest at the intersection with the forward damming wall. Such a tapered recessed top wall portion provides an increased fluid area for evaporation of fluid in the trap means by the gases flowing past the fluid trap means.

A filter housing for an air filter according to this invention may also include an integral pressure sensing means comprising a differential pressure switch located on the housing cover external to the filtration chamber, a high pressure portion for routing a volume of non-filtered air from the filtration chamber through a wall portion of the housing cover to the differential pressure switch, and a low pressure port for routing a volume of filtered air from the filtration chamber through a wall portion of the housing cover to the differential pressure switch. Preferred integral pressure sensing means may also further comprise an electrical quick disconnect coupling to permit rapid servicing of an air filter located within the housing.

The drawings constitute a part of this specification and include exemplary embodiments of the present invention while illustrating various objects and features thereof. It will be understood that in some instances relative material thicknesses and relative component sizes may be shown exaggerated, to facilitate an understanding of the invention.

BRIEF DESCRIPTION OF THE DRAWINGS

FIG. 1 is a side elevation view of a representative engine comprising a turbocharger and a flame starter with an engine air filter located therebetween.

FIG. 2 is a front elevation view of a filter housing according to the present invention.

DETAILED DESCRIPTION OF THE INVENTION

Figure 3:
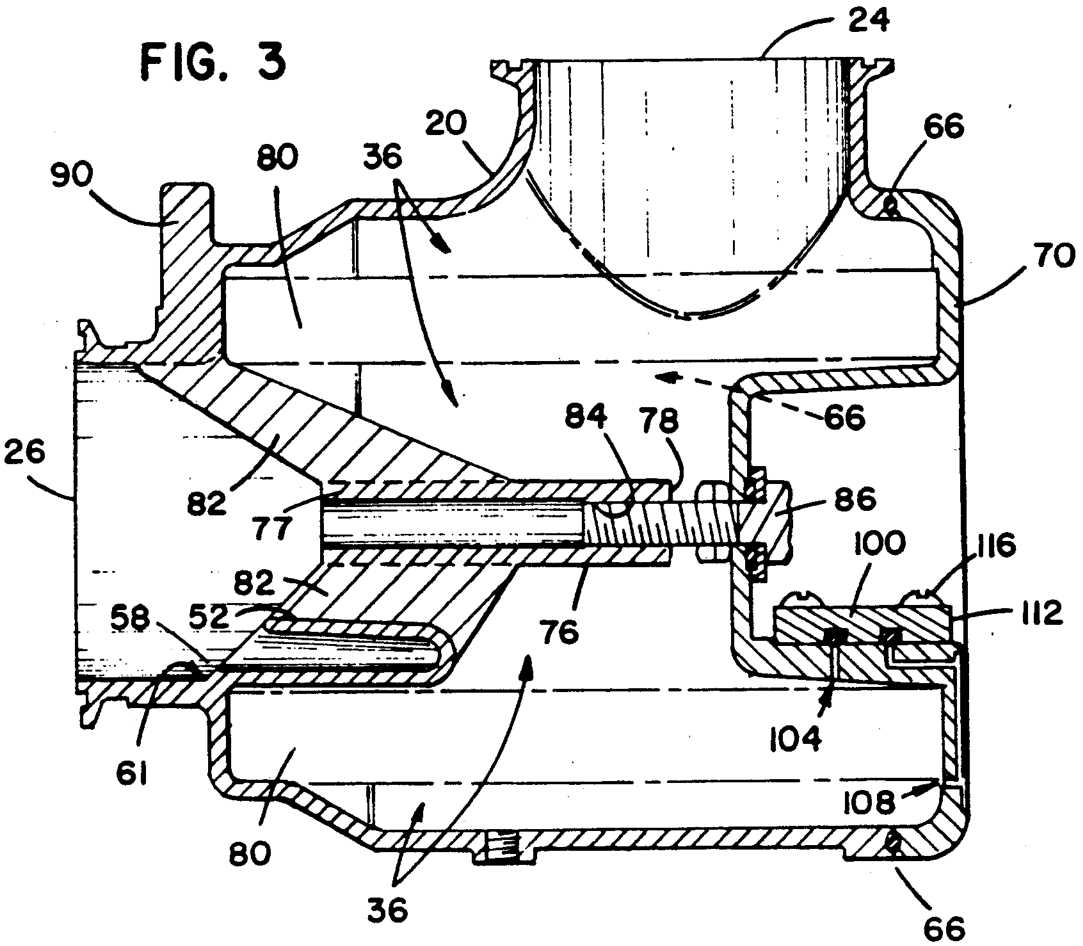
FIG. 3 is a side cross-sectional view of a preferred filter housing shown with a representative filter element placed therein and with pressure sensing means integral to the housing cover.

As required, detailed embodiments of the present invention are disclosed herein. It is to be understood, however, that the disclosed embodiments are merely exemplary of the invention, which may be embodied in various forms. Therefore, specific structural and functional details disclosed herein are not to be interpreted as limiting, but rather as a basis for the claims and as a representative basis for teaching one skilled in the art to variously employ the present invention in virtually any appropriately detailed system or structure.

Although a filter housing fluid trap means of the present invention is preferably utilized in a vehicular engine, it should be understood that this invention may also be adapted for use in other environments and engines which require filtration systems that may be otherwise degraded by fluid flowing onto filter elements therein.

Referring to FIG. 1, the reference numeral 10 generally designates a representative vehicular engine. Although engine 10 may represent various types of engines, an exemplary engine 10 comprises a diesel engine designed for use on military combat vehicles. Accordingly, engine 10 must endure environmental rigors not normally encountered by conventional engines. Moreover, such environments demand greater engine reliability and performance than in most commercially oriented environments. Indeed, engines such as engine 10 placed in virtually any off-road vehicles encounter harsher operating conditions that demand higher standards of engine air filtration. Frequently, such environments include high concentrations of particulate, such as dust, within the air that is entering an engine filtration system. Engine 10 must therefore be constructed to filter this particulate in a very efficient and durable manner.

However, the effectiveness of filter elements in an air filtration system is substantially reduced by any moisture which accumulates in the filter elements. Thus, as fluid or moisture enters a filter element in air filtration systems of engines in harsh environments, the overall system reliability and survivability may be placed in jeopardy. Heretofore, engine air filtration systems have not provided adequate means for preventing flow of certain fluids into associated filter elements within the air filtration system. Accordingly, the present invention provides an improved filter housing which prevents fluid contact with filter elements placed therein and which contributes to greater reliability and engine performance.

Although various sources of fluid in engines may cause fluid to enter engine air filters, engine 10 illustrates a particular problem relating to a fluid source associated with engine flame starters. As illustrated in FIG. 1, engine 10 includes a turbocharger 14, a flame starter 18, and a filter housing 20. In vehicles with flame-type starting systems such as flame starter 18, it is quite common for raw fuel to exit flame starter 18 and move toward filter housing 20. This raw fuel, or non-combusted fuel, in engine 10 may be diesel fuel. The fuel typically travels away from flame starter 18 toward filter housing 20 in a direction which is opposite to the normal operational gaseous flow, represented by bold arrows in FIG. 1, within engine 10.

Many prior art engines merely use an elbow joint connection between turbocharger 14 and flame starter 18. Also, primary air filters are normally located distant to engine 10. However, by placing filter housing 20 between turbocharger 14 and flame starter 18, a security filter arrangement is provided. In other words, greater engine security is assured by placement of a secondary filter between the components and within filter housing 20. However, the placement of filter housing 20, with an accompanying filter element therein, at a position proximate to flame starter 18 may provide false assurance of air filtration capabilities. Indeed, if raw fuel enters filter housing 20 and contacts the filter elements of a filter therein, the filtration capability of the system is less than would be expected. For example, engine gases exiting turbocharger 14 and entering filter housing 20 at first opening 24 may exit filter housing 20 at second opening 26 with substantially very little reduction in particulate content due to moisture clogged filter elements. What has been needed therefore is a filter housing comprising means for trapping fluid entering the filter housing to prevent any fluid from contacting air filter elements located in that housing.

Referring to FIG. 2, a preferred filter housing 20 according to the present invention is depicted in a front elevational view axially through second opening 26. Preferred filter housing 20 for an engine air filter comprises a filter housing body 30 having wall portions forming an internal filtration chamber 36. As described above, filter housing body 30 wall portions define a first opening 24 and a second opening 26 for passage of engine gases through filtration chamber 36 between engine components.

Preferably, first opening 24 provides a gaseous path and connection with an engine turbocharger conduit 40, and second opening 26 provides a connection and a gaseous path with an engine flame starter conduit 42. Thus, filter housing 20 provides means for placing a filter element within the gaseous flow path of engine gases flowing between turbocharger 14 and flame starter 18. A preferred means for mounting a filter element within filtration chamber 36 will be later described and detailed.

Filter housing 20 comprises means for trapping fluid entering filtration chamber 36 and for preventing any fluid from contacting an air filter located in chamber 36. More specifically, fluid trap means 50 is provided. As illustrated in FIG. 2, fluid trap means 50 comprises wall portions defining a fluid collecting volume, labelled V, extending from proximate second opening 26 into filtration chamber 36. Fluid trap means 50 is thus located along a probable flow path of any liquid fuel flowing from flame starter 18 toward filter housing 20. Accordingly, fluid trap means 50 comprises wall portions providing a fluid path leading into trap means collecting area having a volume V near the housing body second opening 26 to prevent contact of any fluid or raw fuel with filter elements located within filtration chamber 36.

Although fluid trap means 50 may comprise various shapes and configurations, preferred fluid trap means 50 comprises a substantially horizontally oriented top wall portion 52. As depicted in the axial view of FIG. 2, fluid trap means 50 also comprises a generally arcuate shaped bottom wall portion 54 which is preferably constructed similar to the shape of a center mounting filter element central aperture. A forward damming wall portion 56 of trap means 50 is constructed and arranged to provide increased surface area at trap means aperture 58 for collecting and guiding fluid entering filter housing 20. Preferably, forward damming wall portion 56 comprises a sloped wall extending from an inner portion 61 of housing second opening 26 upward and into filtration chamber 36 in order to maximize the unobstructed diameter of second opening 26 and to reduce any turbulence or pressure loss of air flowing through second opening 26. This sloped forward damming wall 56 is shown in side elevation cross-sectional view in FIG. 3. Also depicted in FIG. 3 is fluid trap means 50 top wall portion 52. Preferred top wall portion 52 comprises a tapered and recessed portion which is widest at the intersection with forward damming wall 56. This tapered recessed top wall portion 52 configuration provides an increased fluid area for evaporation of fluids trapped within trap means 50 by the engine gases flowing past fluid trap means 50. This evaporation process results in discharge of the vaporized fuel in a manner which comports with the engine gas flow cycle and which does not degrade the reliability of the filtration system.

Referring further to FIGS. 2 and 3, means for accessing filtration chamber 36 to insert and remove an air filter is shown. Preferably, means for accessing filtration chamber 36 comprises a housing wall portion third opening 66 located substantially opposite housing second opening 26. A housing cover 70 is shown removably connected to housing body 30 at third opening 66. Preferably, housing cover 70 is constructed and arranged to provide ready access to filtration chamber 36 in order to insert and remove an air filter therein. A readily removable yet secure housing cover 70 may be provided by arranging an aperture 72 through housing cover 70 for receipt of a threaded mounting bolt 74, or other attaching means, for connecting housing cover 70 to a portion of filter housing 20. Preferred housing 20, comprises a filter element support 76 which is axially arranged in filtration chamber 36. Preferred filter element support 76 comprises a first end 77 connected to housing body 30 proximate second opening 26, and a second end 78 positioned opposite first end 77. Preferably, second end 78 is configured for receipt of a mountable air filter, such as representative air filter 80 shown in partial sectional view in FIG. 3. Substantial stress enhancing features and manufacturing cost savings may be realized by arranging filter element support 76 strengthening member 82 as illustrated in FIG. 2. Moreover, strengthening member 82 may comprise an aerodynamic or fared member as illustrated in FIG. 3 so that filter element support 76 is placed well within filtration chamber 36 to minimize any disruption to the aerodynamic shaping of the air flow proximate second opening 26.

Figure 4:
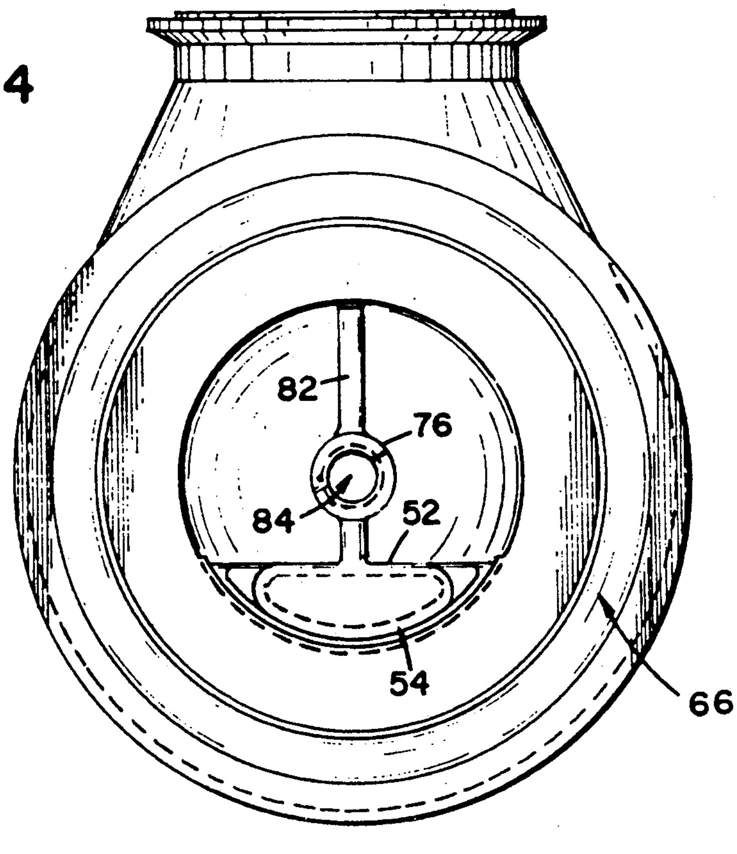
FIG. 4 is a rear elevation view of a preferred filter housing for an engine air filter with the housing cover removed.

As further illustrated in FIGS. 3 and 4, filter element support 76 may comprise a second end cavity 84 comprising means for receiving a housing cover 70 mounting bolt 86 or other suitable mounting means for housing cover 70. Cavity 84 may further comprise wall portions which are threaded to provide greater attaching force for a threaded mounting bolt such as mounting bolt 86.

FIGS. 2 and 3 illustrate means for attaching filter housing 20 to engine 10. Although various mounting configurations may be accomplished according to this invention, a preferred mounting flange 90 is provided. Moreover, engine 10 may be mounted in various vehicular configurations. Such configurations may require mounting filter housing 20 in a vertical orientation, as illustrated in FIGS. 1 and 2, or at various other rotationally adjusted angles. For example, certain engine configurations may require filter housing 20 to be located on a left side of engine 10 while other configurations may require filter housing 20 to be oriented on the right side of engine 10. Indeed, certain engines may even require mounting of filter housing 20 on both sides of the engine. It is therefore important to provide means for compactly mounting filter housing 20. Mounting flange 90 provides means for ambidextrous mounting of filter housing 20 on engine 10. Specifically, preferred filter housing 20 comprises externally located mounting flange 90 having a plurality of mounting apertures 96, such as threaded bolt holes, located preferably in symmetric arrangement on flange 90. A symmetric or other predetermined arrangement of mounting apertures 96 permits mounting filter housing 20 between engine components at various rotational angles.

Although differential pressure sensing means are known in the filter art, no such sensing means are provided for an air filter housing which comprises sensing means integral to the housing for sensing differential pressure across an air filter mounted in a filtration chamber. Accordingly, the present invention provides a filter housing 20 comprising means for accessing filtration chamber 36 to insert and remove an air filter, the accessing means comprising an access opening, such as opening 66 shown in FIG. 3, and a housing cover, such as housing cover 70, removably connected to housing 20 at the access opening. Pressure sensing means is provided that is integral to housing cover 70 for sensing the differential pressure across air filter 80 mounted in filtration chamber 36.

More particularly, FIG. 3 illustrates housing cover 70 removably connected to housing 20 at housing third opening 66. Pressure sensing means is provided integral to housing cover 70 preferably comprising a differential pressure switch 100 located on housing cover 70 external to filtration chamber 36. Also, preferred integral pressure sensing means comprises a high pressure sensing port 104 for routing a volume of non-filtered gas from filtration chamber 36 through a wall portion of housing cover 70 to differential pressure switch 100. A low pressure sensing port 108 is provided for routing a volume of filtered gas from filtration chamber 36 through a wall portion of housing cover 70 to differential pressure switch 100. Preferred integral pressure sensing means 112 thus provides substantial improvements over any known air filter sensing mechanisms. For example, integral pressure sensing means 112 requires no extra piping or conduits external to housing cover 70. Moreover, a more accurate pressure sensing may be achieved by eliminating extra piping and consequential pressure loss. Thus, integral pressure sensing means 112 may also include readout means for indicating with great precision the exact pressures being sensed on either side of an air filter. Other benefits of this preferred integral pressure sensing means 112 include quick connect and disconnect means 116 for electrical sensing connections, as well as the advantage of ready accessibility of the differential pressure sensing element for service and maintenance.

The invention accordingly consists in the features of the construction, combinations of elements, and arrangements of parts which will be exemplified in the construction described above and of which the scope of the invention would be indicated in the following claims. It is to be understood that while certain embodiments of the present invention have been illustrated and described, the invention is not to be limited to the specific forms or arrangements of parts herein described and shown.

What is claimed is:

1. A filter housing for an engine air filter, comprising:

a) a filter housing body having wall portions forming an internal filtration chamber, the wall portions defining a gas inlet opening and a gas exhaust opening for passage of engine gases through the filtration chamber;

b) means for accessing the filtration chamber to insert and remove an air filter; and c) fluid trap means for trapping fluid entering the filtration chamber through the housing body gas exhaust opening in a direction opposite the normal gas flow and for preventing any fluid from contacting an air filter located in the internal filtration chamber, the fluid trap means comprising wall portions defining a fluid collecting volume extending into the filtration chamber and a trap means aperture providing a fluid path into the trap means at the filter housing body gas exhaust opening.

2. The filter housing according to claim 1, further comprising a filter element support axially arranged in the internal filtration chamber comprising a first end connected to the housing body proximate the gas exhaust opening and a second end opposite the first end configured for receipt of a mountable air filter.

3. The filter housing according to claim 2, wherein the filter element support second end comprises a hollow open ended internally threaded cavity.

4. The filter housing according to claim 3, wherein the means for accessing the filtration chamber comprises:

a) a housing wall portion third opening located substantially opposite the housing wall portion gas exhaust opening; and b) a housing cover removably connected to the housing at the third opening.

5. The filter housing according to calim 4, wherein the housing cover comprises a central aperture constructed and arranged for receipt of a mounting member for connecting the housing cover to the filter element support second end threaded cavity.

6. The filter housing according to claim 1, further comprising an external mounting flange having a plurality of mounting apertures for mounting the housing between engine components at various rotational angles.

7. The filter housing according to claim 2, wherein the fluid trap means and the filter element support are integrally constructed with the filter housing.

8. The filter housing according to claim 1, wherein the fluid trap mans comprises:

a) a substantially horizontally oriented top wall portion;

b) an arcuate bottom wall portion having a curvature which is contoured to the shape of a filter element central mounting aperture;

c) a rear wall portion; and d) a forward damming wall portion constructed and arranged to provide increased surface area proximate the trap means aperture for collecting and guiding fluid into the trap means aperture.

9. The filter housing according to claim 8, wherein the forward damming wall is a sloped wall extending from an inner portion of the housing gas exhaust opening upward and into the filtration chamber to maximize the diameter of the gas exhaust opening and to reduce the pressure loss of air flowing through the gas exhaust opening.

10. The filter housing according to claim 8, wherein the fluid trap means top wall portion comprises a tapered and recessed portion which is widest at the intersection with the forward damming wall, the tapered and recessed top wall portion providing an increased fluid area for evaporation of fluid trapped within the fluid trap means by gases flowing past the fluid trap means.

11. A filter housing for an engine air filer, comprising:

a) a filter housing body having wall portions forming an internal filtration chamber, the wall portions defining a gas inlet opening and a gas exhaust opening for passage of engine gases through the filtration chamber to engine components;

b) means for accessing the filtration chamber to insert and remove an air filer comprising:

i) a housing wall third opening located substantially opposite the housing wall gas exhaust opening;

ii) a housing cover removably connected to the housing at the housing wall third opening, the housing cover comprising a central aperture contacted and arranged for receipt of a threaded mounting bolt;

c) a filter element support axially arranged in the chamber comprising a first end connected to the housing body proximate the gas exhaust opening and a second end opposite the first end configured for receipt of a slidably mounted air filter, the filter element support second end comprising a hollow open-ended internally threaded cavity for receiving the housing cover mounting bolt; and d) fluid trap means comprising wall portions defining a fluid collecting volume located within the filtration chamber for trapping fluid entering the gas exhaust opening in a direction opposite the normal gas flow through the housing and for preventing contact of any such fluid with an air filter located in the housing.

12. The filter housing according to claim 11, further comprising an external mounting flange having a plurality of mounting apertures located in an arcuate arrangement on the flange for mounting the housing between engine components at various rotational angles.

13. The filter housing according to claim 11, wherein the fluid trap means and the filter element support are integrally constructed with the filter housing.

14. The filter housing according to claim 11, wherein the fluid trap means comprises:

a) a substantially horizontally oriented top wall portion;

b) an arcuate bottom wall portion having a curvature which is contoured to the shape of a filter element central mounting aperture;

c) a rear wall portion; and d) a forward damming wall portion constructed and arranged to provide increased surface area proximate the trap means aperture for collecting and guiding fluid into the trap means aperture.

15. The filter housing according to claim 14, wherein the forward damming wall is a sloped wall extending from an inner portion of the housing gas exhaust opening upward and into the filtration chamber to maximize the diameter of the gas exhaust opening and to reduce the turbulence of air flowing through the gas exhaust opening.

16. The filter housing according to claim 14, wherein the fluid trap means top wall portion comprises a tapered recessed portion which is widest at the intersection with the forward damming wall, the tapered recessed top wall portion providing increased fluid area for evaporation by the gases flowing past the fluid trap means.

17. A filter housing for an engine air security filter, comprising:

a) a filter housing body having wall portions forming an internal filtration chamber, the wall portions defining a gas inlet opening connected to an engine turbocharger conduit and a gas exhaust opening connected to an engine flame starter conduit so that the filter housing permits filtration of engine gases flowing through the filtration chamber between the turbocharger and the flame starter;

b) means for accessing the filtration chamber to insert and remove an air filter comprising:

i) a housing wall third opening located substantially opposite the housing wall gas exhaust opening;

ii) a housing cover removably connected to the housing at the housing wall third opening;

c) a filter element support axially arranged in the chamber comprising a first end connected to the housing body proximate the gas exhaust opening and a second end opposite the first end configured for receipt of a slidably mounted air filter; and d) fluid trap means comprising wall portions defining a volume located within the filtration chamber for trapping fluid flowing into the filtration chamber in a direction opposite the normal gas flow at the second opening of the housing and for preventing contact of any such fluid with an air filter located in the housing.

18. The filter housing according to claim 17, wherein the filter element support second end comprises a hollow open ended internally threaded cavity.

19. The filter housing according to claim 17, wherein the housing cover comprises a central aperture constructed and arranged for receipt of a threaded mounting bolt for connecting the housing cover to the filter eelement support second end threaded cavity.

20. The filter housing according to claim 17, further comprising an external mounting flange having a plurality of mounting apertures located on the flange for mounting the housing between engine components at various rotational angles.

21. A filter housing for an engine air security filter, comprising:

a) a filter housing body having wall portions forming an internal filtration chamber, the wall portions defining a gas inlet opening connected to an engine turbocharger conduit and a gas exhaust opening connected to an engine flame starter conduit so that the filter housing permits filtration of engine gases flowing through the filtration chamber between the turbocharger and the flame starter;

b) means for accessing the filtration chamber to insert and remove an air filter comprising:

i) a housing wall third opening located substantially opposite the housing wall gas exhaust opening;

ii) a housing cover removably connected to the housing at the housing wall third opening;

c) a filter element support arranged in the chamber comprising a first end connected to the housing body proximate the gas exhaust opening and a second end opposite the first end configured for receipt of an air filter; and d) fluid trap means comprising wall portions defining a volume located within the filtration chamber for trapping fluid entering the housing and flowing in a direction opposite the direction of gas flow at the gas exhaust opening of the housing and for preventing contact of any fluid with an air filter located in the housing, the fluid trap means comprising:

i) a substantially horizontally oriented top wall portion;

ii) an arcuate bottom wall portion having a curvature which is contoured to the shape of a filter element central mounting aperture;

iii) a rear wall portion; and iv) a forward damming wall portion constructed and arranged to provide increased surface area proximate the trap means aperture for collecting and guiding fluid into the trap means aperture.

22. The filter housing according to claim 21, wherein the filter element support second end comprises a hollow open ended internally threaded cavity.

23. The filter housing according to claim 21, wherein the housing cover comprises a central aperture constructed and arranged for receipt of a threaded mounting bolt for connecting the housing cover to the filter element support second end threaded cavity.

24. The filter housing according to claim 21, further comprising an external mounting flange having a plurality of threaded apertures located in an arcuate arrangement on the flange for mounting the housing between engine components at various rotational angles.

25. A filter housing for an engine air security filter, comprising:

a) a filter housing body having wall portions forming an internal filtration chamber, the wall portions defining a gas inlet opening connected to an engine turbocharger conduit and a gas exhaust opening connected to an engine flame starter conduit so that the filter housing permits filtration of engine gases flowing through the filtration chamber between the flame starter and the turbocharger;

b) means for accessing the filtration chamber to insert and remove an air filter comprising:

i) a housing wall third opening located substantially opposite the housing wall gas exhaust opening;

ii) a housing cover removably connected to the housing at the housing wall third opening;

c) an integral filter element support axially arranged in the chamber comprising a first end connected to the housing body proximate the gas exhaust opening and a second end opposite the first end configured for receipt of a slidably mounted air filter;

d) integral fluid trap means comprising wall portions defining a volume located within the filtration chamber for trapping fluid flowing in a direction opposite the direction of gas flow at the gas exhaust opening of the housing and for preventing contact of any fluid with an air filter located in the housing; and e) pressure sensing means integral to the housing cover for sensing the differential pressure across an air filter mounted in the filtration chamber, the integral pressure sensing means comprising:

i) a differential pressure switch located on the housing cover external to the filtration chamber;

ii) a high pressure sensing port for routing a volume of no-filtered engine gas from the filtration chamber through a wall portion of the housing cover to the differential pressure switch;

iii) a low pressure sensing port for routing a volume of filtered engine gas from the filtration chamber through a wall portion of the housing cover to the differential pressure switch; and iv) an electrical quick-disconnect coupling to permit rapid servicing of an air filter located within the housing.

* * * * *

UNITED STATES PATENT AND TRADEMARK OFFICE
CERTIFICATE OF CORRECTION

PATENT NO. : 5,034,037
DATED : July 23, 1991
INVENTOR(S) : Harold et al.

It is certified that error appears in the above-identified patent and that said Letters Patent is hereby corrected as shown below:

In Column 1, line 24, "lifes" should read --life--.

In Column 7, line 61, claim 5, "calim" should read --claim--.

In Column 8, line 33, claim 11, "filer" should read --filter--.

In Column 8, line 47, claim 11 (b-ii), "contacted" should read --constructed--.

In Column 12, line 8, claim 25 (e-ii), "no-filtered" should read --non-filtered--.

Signed and Sealed this

Nineteenth Day of November, 1991

*Attest:*

HARRY F. MANBECK, JR.

*Attesting Officer* *Commissioner of Patents and Trademarks*